Aug. 23, 1966 F. PAGENSTECHER 3,267,920
MARINE ENGINE PROVIDED WITH MEANS TO PREVENT THE FLOODING
THEREOF IN THE EVENT OF UPSET IN WATER
Filed Feb. 25, 1965 2 Sheets-Sheet 1
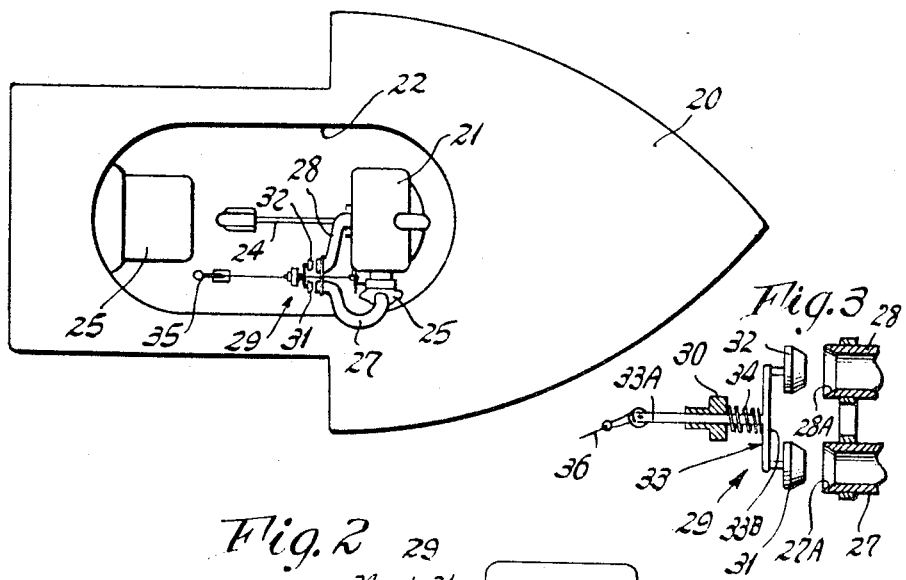
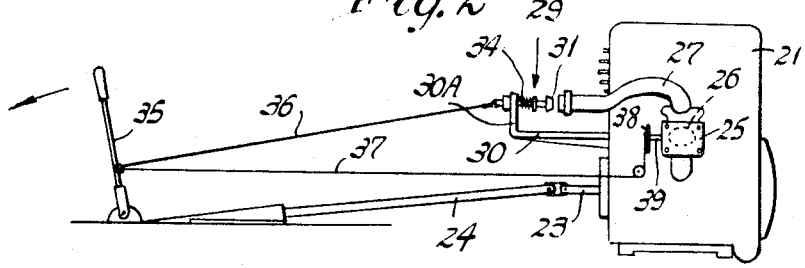
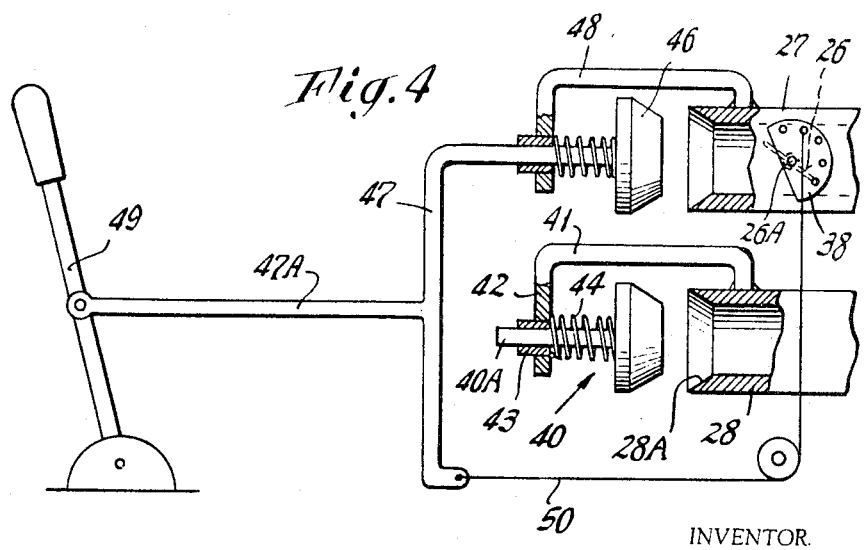
INVENTOR.
FABIO PAGENSTECHER
BY
Arthur G. Fattibene
ATTORNEY Aug. 23, 1966  F. PAGENSTECHER  3,267,920
MARINE ENGINE PROVIDED WITH MEANS TO PREVENT THE FLOODING
THEREOF IN THE EVENT OF UPSET IN WATER
Filed Feb. 25, 1965
2 Sheets-Sheet 2
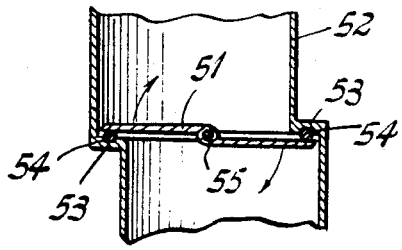
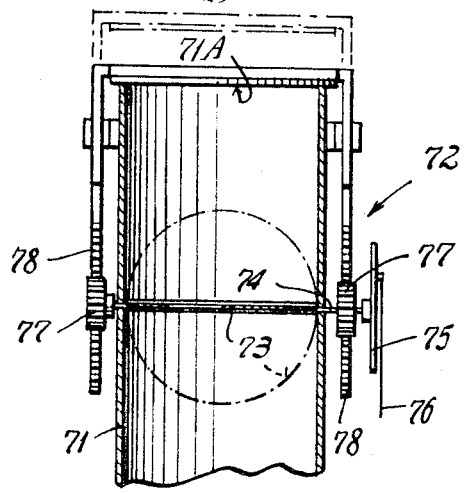
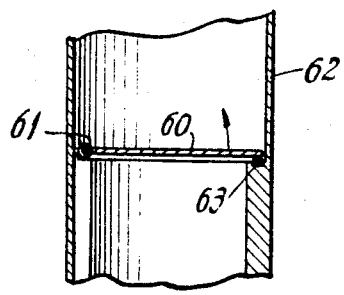
INVENTOR.
FABIO PAGENSTECHER
BY
Arthur F Fattibene
ATTORNEY

United States Patent Office 3,267,920
Patented August 23, 1966

3,267,920
MARINE ENGINE PROVIDED WITH MEANS TO PREVENT THE FLOODING THEREOF IN THE EVENT OF UPSET IN WATER
Fabio Pagenstecher, Milan, Italy
(541 E. 87th St., New York, N.Y.)
Filed Feb. 25, 1965, Ser. No. 435,314
15 Claims. (Cl. 123—98)

This application is a continuation-in part application of application Serial No. 387,356 filed August 4, 1964, now abandoned.

This invention relates in general to a marine engine, and more specifically to a marine engine adapted for use on a boat or watercraft constructed and arranged so as to prohibit the flooding of the engine in the event that the engine is accidentally submerged in water.

Many watercrafts, such as for example, small open boats, hydroplanes, and the like, are powered by internal combustion engines; and such boats are frequently used in sport for racing. Because of the size, shape or instability of such boats, and the use to which they are generally put, it happens, as for example in racing, or on rough seas, that they can be and/or are frequently upset in the water. Heretofore, when this occurred, the engine more than likely would become internally flooded by water entering through the exhaust outlet and through the air intake. When this occurred, the engine could not then be readily placed in operation. Further, such flooding could and did cause considerable damage to the engine. This is particularly true in the event that the engine is flooded with sea water because the salt content of such water is highly corrosive to the metallic parts of the engine.

It is therefore an object of this invention to provide an internal combustion engine adapted for use on marine crafts which is constructed and arranged so as to render the same flood proof in the event that it is accidentally upset or submerged in the water.

It is another object of this invention to provide a marine engine with means for effecting the automatic closure of the exhaust outlet and air intake to render the same fluid tight in the event that the marine engine is accidentally submerged or upset in water.

It is another object of this invention to provide a marine engine in which the exhaust outlet and air intake are respectively provided with closure means that are normally biased to their respective closed position, and which are manually operated to open position when the engine is operating.

It is another object of this invention to provide a flood proof closure for the exhaust outlet of a marine engine, constructed and arranged so as to be normally biased to a closed position when the engine is not operating, and which will be automatically open by the force of the exhaust gas pressure operating thereon when the engine is operating.

Still another object of this invention is to provide a flood proof closure means for the air intake that is actuated simultaneously with the operation of the throttle valve controlling the air flow to the carburetor of the engine.

Another object of this invention is to provide a marine engine with a throttle construction to render the air intake of the engine fluid tight in the inoperative position thereof to prevent flooding of the engine in the event that the same is overturned or submerged in water.

Another object of this invention is to provide a marine engine with means for automatically sealing or closing the exhaust outlet and air intake of the engine that is relatively simple in construction, relatively simple to fabricate, easy to control and operate, and which is positive in operation.

The foregoing objects and other features and advantages of the instant invention are readily attained by a marine engine provided with means for sealing fluid tight the air intake to the carburetor and the exhaust outlet. In accordance with this invention, the sealing or closure means comprises, in one form of the invention of valve head closures that respectively form a flood proof seal for the air intake and the exhaust outlet respectively in the event that the engine is automatically submerged. Means are provided for normally biasing the respective valve head closures to their normally closed or sealed positions. A manually operated actuating means is operatively connected to at least one of the valve head closures and the throttle valve to effect simultaneous operation of the connected valve head closure and the throttle valve. In another form of the invention valve head closures for both the air intake and the exhaust outlet are operatively associated with the throttle valve so that the operation of the valve head closures on both the air intake and exhaust outlet are simultaneously actuated with the operation of the throttle valve.

In another form of the invention, the valve head closure for the exhaust outlet is constructed and arranged so that the same is opened automatically by the force of the exhaust gases acting thereon when the engine is operating.

In another form of the invention, the throttle valve is constructed and arranged so that the same is rendered fluid tight in the inoperative position thereof, and thereby functions as a water proof seal for the air intake.

It is therefore a feature of this invention to provide a marine engine with closure means that will effectively and positively close the inlet to the air intake and the exhaust outlet in the event that the engine is submerged in water.

Another feature of this invention resides in a valve head closure for the exhaust outlet which is constructed and arranged so as to be automatically actuated by the force of the exhaust gases acting thereon.

It is another feature of this invention to provide closure means for preventing the flooding of a marine engine through the air intake and/or exhaust outlet thereof, which means are arranged so as to be simultaneously actuated upon the actuation of the throttle valve controlling the air intake to the engine.

It is another feature of this invention to utilize a specifically constructed throttle valve construction to prevent flooding of the engine in the event that the same is capsized or submerged in water.

Other features and advantages of the invention will become more readily apparent when considered in view of the drawings and specification in which:

FIGURE 1 is a plan view of a watercraft utilizing the engine construction of the instant invention.

FIGURE 2 is a side elevation detail view of the marine engine utilizing the invention of the instant application.

FIGURE 3 is a detail fragmentary plan view of the air intake and exhaust outlet closure means as applied to the embodiment of FIGURES 1 and 2.

FIGURE 4 is a fragmentary view of a modified form of the invention.

FIGURE 5 illustrates a fragmentary sectional view of still another form of the invention wherein the throttle valve is utilized as the closure means for the air intake to the marine engine in the event that the same is submerged in water.

FIGURE 6 illustrates still a further embodiment of a modified air intake closure means for this air intake in accordance with the instant invention.

FIGURE 7 illustrates a further modification.

Referring to the drawings, there is shown in FIGURE 1 a watercraft 20 powered by a marine engine 21 that embodies the air intake and exhaust outlet closure means of the instant invention. In the illustrated form of the invention, the boat construction comprises a hydroplane type craft having an open cockpit 22 in which the engine 21 in mounted. The crank shaft 23 of the engine 21 is connected to the propeller of the boat by a drive shaft 24. Immediately to the rear of the engine, there is provided the seat 25 for the driver.

In accordance with this invention, the engine 21 includes a carburetor 25 and a throttle valve 26 control to regulate the amount of air mixing with the fuel. In the illustrated form of the invention, an air intake conduit 27 is connected to the carburetor 25 for directing the necessary air thereto.

The manifold of the engine has connected thereto an extended exhaust conduit or outlet. In the illustrated embodiment, the respective air intake conduit 27 and exhaust conduit 28 are constructed and arranged so that the respective inlets 27A and outlet 28A thereof are disposed juxtaposed to one another.

To prevent flooding of the engine in case of upset there is provided in accordance with this invention, closure means 29 which forms a water tight seal at the exhaust outlet 28A and the inlet 27A to the air intake 27. In the form of the invention disclosed in FIGS. 1 to 3, there is provided a bracket 30 which is suitably connected to the engine 21. The bracket 30 is formed generally of an angle member having a leg 30A portion spaced from the open ends 27A, 28A of the air intake conduit and exhaust conduit respectively. The closure means 29 for the respective conduits include a pair of valve head closures 31, 32 connected to a yoke 33 which is slidably supported on the bracket 30 by having a stem portion 33A slidably received in an opening formed in the bracket 30. The arrangement is such that the respective valve head closures 31, 32 are normally biased toward their closed positions by means of a coil spring 34 disposed about the stem 33A between the bracket 30 and the cross-member 33B of the yoke 33.

A manually operated means is provided whereby the respective valve head closures 31, 32 may be actuated between an operative and inoperative position. As shown, the valve operating or actuating means comprises a lever 35 which is pivoted to a portion of the boat. A suitable connecting means, as for example, a link or cable 36 is interconnected between the lever 35 and the stem 33A of the yoke 33. Accordingly, it will be noted that when the lever 35 is pivoted to the left, as indicated in FIGURE 2, the displacement of cable or connecting link 36 between the stem 33A and the lever 35 causes the valve closure 31, 32 to be urged against the bias of the spring 34 toward open position. In the illustrated form of the invention, a cable or link 37 is also operatively connected to a sector 38 that is journalled to the end of the throttle valve shaft 39 so that the throttle valve is simultaneously actuated upon the operation of the valve head closures 31, 32.

In operation the driver is at all times required to maintain a force on the lever 35 i.e. hold it to the left as viewed in FIGURE 2, so as to maintain the valve head closures 31, 32 to their open position. Accordingly, in the event that the boat 20 should be accidentally capsized or turned over, or the driver thrown out of the boat, the arrangement is such that the spring 34 acting on the yoke 33 of the valve head closures 31, 32 will automatically return the closures to their operative, closed position, upon the release of the lever 35 by the driver. Consequently, in a capsized position, the respective air intake 27 and exhaust outlet 28 are sealed water tight and whereby flooding of the engine is prohibited. The sealing can be optimumly effected by providing a smooth tight fit or by applying suitable gaskets between the valve closures and the respective conduits. Thus upon uprighting the boat, it will be readily apparent that since the engine has been sealed or protected against internal flooding, that it is rendered readily operative for instant use upon uprighting of the boat.

From the foregoing it will be readily understood that the engine can not be started or idle as long as the valve closures 31, 32 are biased to their closed position. For this reason it will be noted that the closure valves 31, 32 provide a further safety in that the engine cannot be started until the closure has been moved and maintained in open position.

FIGURE 4 illustrates a modified form of the invention. In this form of the invention, the valve head closure 40 forming the fluid tight seal for the exhaust outlet 28 is constructed and arranged so as to be automatically operated by the force or pressure of the exhaust gases operating thereon when the engine is operating. In this form of the invention, it will be noted that a bracket 41 is suitably connected to either the engine or the exhaust conduit with a leg portion 42 thereof spaced from the end 28A of the exhaust conduit. A valve head closure 40 is disposed in axial alignment with the opening 28A in the end of the exhaust conduit. The stem 40A of the valve head closure is slidably supported in a suitable bearing 43 connected to the bracket 41 and a coil spring 44 is disposed about the stem 40A of the valve closure 40 between the bracket 42 and the valve head to bias the valve head toward its closed position. In accordance with this form of the invention, it is to be noted that the tension of the spring 44 is such that the force it exerts on the closure 40 is overcome by force of the exhaust gases acting on the valve head 40. Thus, it will be noted that as long as the engine is operating, the force of the combustion gases exhausting through the exhaust conduit 28 maintains the valve head closure 40 toward open position, as shown. Upon capsizing of the boat or in the event that the engine should stall and thereby cease operating, the spring 44 acting on the valve head closure 40 will automatically bias the valve head to its closed water tight position.

The valve head closure 46 for the air intake 27 in this form of the invention is somewhat similar in structure that previously described reference to FIGURES 1 through 3. As illustrated, the valve head closure 46 is connected to a yoke 47 for the air intake mounted on a suitable bracket 48 connected to the air intake of the engine. The stem 47A of the yoke 47 in turn is operatively connected to the operating lever 49 whereby the yoke 47 may be manually controlled or displaced by the driver of the boat. Connected to the yoke 47 so as to be rendered simultaneously actuated therewith is a cable 50 which connects to the throttle valve 26. In the illustrated form of the invention, it is to be noted that the throttle valve 26 is journalled about a pivot or shaft 26A that extends through the side wall of the air intake conduit 27 and which shaft has connected thereto 38 a sector to which the connecting cable 50 is secured. Consequently, it will be noted that the driver, by manually operating the control lever 49, simultaneously effects the operation of the throttle valve 26 and the opening of the valve head closure 46 controlling the air intake. In operation, the form of the invention disclosed in FIGURE 4 is substantially similar to that herebefore described with reference to FIGURES 1 and 2, with the exception that the valve head closure 40 for the exhaust outlet 28 is automatically operated by the pressures of the exhaust gases and the biasing spring 44 acting thereon.

FIGURE 5 illustrates a modified form of the invention. In this form of the invention, the throttle valve 51 is utilized as the water tight closure means for sealing the intake 52 from flooding. In this form of the invention, it is to be noted that the air intake conduit 52 is provided with offset portions to define an internal shoulder 53 which as adapted to cooperate with the periphal portions of a butterfly throttle valve 51. Accordingly, a suitable gasket 54 is recessed in the shoulders 53 defined by the offset of the air intake conduit to form a seal with the periphery of the valve. The stem 55 of the butterfly valve in turn has connected thereto the throttle segment similar to that illustrated in FIGURE 4 by which the same is operated. Consequently, the sector is connected by a suitable connecting means to an operating lever as herein described whereby the operator or driver may control the setting of the throttle valve by a suitable operating or actuating lever, it being understood that a suitable spring is provided to operate on the butterfly valve so as to normally bias the same towards its closed position, as indicated in FIGURE 5, whenever the operating lever is released. Thus it will be noted that as soon as the operator releases the lever for any reason, as hereinbefore described, the throttle valve 51 is automatically urged to its closed position, and thereby causes the air intake 52 to be sealed fluid tight to prohibit the flooding of the engine in case of upset.

FIGURE 6 illustrates still another modified form of closure valve 70 for the air intake conduit 71. In this form, the inlet 71A of the air intake is sealed by a flanged closure 70 which is biased towards its closed or sealed position by a rack and pinion assembly 72. Accordingly, the throttle valve 73 is biased toward inoperative portion by a suitable spring means. Preferably the throttle valve 73 comprises the butterfly type pivoted about a shaft 74 that extends through the wall of the air intake conduit 71. Journalled to the shaft in the sector 75, as hereinbefore described, to which the connecting cable or link 76 of the actuating means or lever is connected. Connected to the throttle shaft 74 on the respective extended end portion thereof is a pinion gear 77 which is disposed in meshing relationship to racks 78 which depend from the valve closure 70. Accordingly, it will noted that whenever the throttle valve 73 is actuated, the pinion 77 connected thereto effect displacement of the racks 78 meshing therewith to open and close the closure valve 70 connected thereto. In the closed throttle position the racks meshing with the pinions maintain the closure 70 in sealing engagement with the end 71A of the air intake 71.

FIGURE 7 illustrates a slightly modified form of the invention. This form of the invention is substantially similar to that of FIGURE 6, except that the throttle valve 60 in constructed as a flap type valve rather than a butterfly type. Accordingly, the flap valve 60 is hinged for movement about a hinge pin 61. Circumscribing the inner wall of the air intake 62 is a shoulder 63 against which the flap valve 60 is biased, and as hereinbefore described defines with the margin of the flap valve 60 a fluid tight seal to prohibit flooding in the event of the engine upsetting in water.

From the foregoing, it will be appreciated that any combination of the variously described closure valves means may be uitilized to render the exhaust conduit and air intake conduit fluid tight. The respective closed valves are each normally biased closed, with the air intake closure being operatively and simultaneously actuated with the throttle valve. Also, in certain embodiments the exhaust outlet closure may be automatically opened whenever the engine is operating by its exhaust gas pressures acting thereon. And in other forms of the invention the water tight seal for the air intake may be effected by the throttle valve construction. In all forms it is to be noted that opening of the air intake closure and the throttle valve setting are simultaneously effected before the engine can be started or allowed to idle.

While the instant invention has been described with respect to certain embodiments thereof, it will be understood that variations and modifications thereof may be made without departing from the spirit or scope of the invention.

What is claimed is:

1. The improvement in marine type internal combustion engines for closing the intake and exhaust thereof when the engine becomes accidently submerged which engine includes a carburetor having an air intake, and an exhaust outlet from the engine, the improvement comprising:
    (a) valve means for opening and closing the air intake and the exhaust outlet from the engine respectively,
    (b) a manually operated means for moving the carburetor throttle valve toward open position,
    (c) a connection between said valve means and said throttle means for opening and closing said throttle and valve means together,
    (d) and spring means for urging said manually operated means to a position positively closing said throttle and valve means on release of the manual pressure from said manually operated means.

2. In a marine engine having a carburetor, a throttle valve, an air intake operatively connected to said carburetor, and an exhaust outlet for said engine, the improvement of comprising:
    (a) valve means operatively associated with the exhaust outlet and air intake respectively for closing the same in the event the engine is accidently submerged in water to prevent flooding of said engine,
    (b) means for normally biasing each of said valve means toward its respective operatively closed position,
    (c) means connected to at least one of said valve means for effecting manual operation thereof against the force of its biasing means,
    (d) and a connection between said one valve means and said throttle valve whereby the opening and closing of said one valve means and said throttle valve are simultaneously actuated.

3. The invention as defined in claim 2 and including means for automatically effecting the opening and closing of the other valve means.

4. In a marine type engine having a carburetor, an air intake operatively connected to said carburetor, a throttle valve to regulate the air flow thereto, and an exhaust outlet for said engine, the improvement of comprising:
    (a) valve means operatively associated with the exhaust outlet and air intake respectively for closing the same fluid tight in the event the engine is accidently submerged in water,
    (b) means for normally biasing each of said valve means toward its respective operatively closed position,
    (c) means connected to at least one of said valve means for effecting manual operation thereof against the force of its biasing means,
    (d) and a means connecting said one valve means and said throttle valve to said manually operated means whereby the opening and closing of said one valve means and said throttle valve are simultaneously actuated upon the actuation of said manual means, and whereby upon the release of said manual means results in an automatic closing of said one valve and throttle valve.

5. In an internal combustion engine adapted for marine use and including in combination therewith a carburetor having an air intake, a throttle valve, and an exhaust outlet from said engine, the improvement of:
    (a) valve means for automatically closing the inlet to said air intake and said exhaust outlet respectively in the event said engine is accidently submerged,
    (b) means for movably supporting said valve means adjacent each of said air intake and exhaust outlet,
    (c) a valve means including a pair of valve heads, one each for closing said inlet to said air intake and said exhaust outlet,
    (d) a spring means for biasing said valve heads closed simultaneously,
    (e) a manually operated means for actuating said valve heads between a normally closed position and an open position,
    (f) said latter means including an operating lever, (g) and a connector extending between said valve heads and said lever whereby said valves are actuated when said lever is operated, (h) and means connected between said lever and throttle valve whereby said valve heads and throttle valve are simultaneously opened and closed upon the actuation of said lever.

6. In an internal combustion engine adapted for marine use and including in combination therewith a carburetor having an air intake, a throttle valve, and an exhaust outlet from said engine, the improvement of:

(a) valve means for automatically closing the inlet to said air intake and to said exhaust outlet respectively in the event said engine is accidentally submerged, (b) a bracket connected to said engine adjacent each of said air intake and exhaust outlet, (c) a valve means including a pair of valve heads, one each for closing said inlet to said air intake and said exhaust outlet, (d) a common stem to which said valve heads are connected, (e) said stem being extended through an opening in said bracket, (f) a spring means mounted about said stem for biasing said valve heads closed simultaneously.

(g) a manually operated means for actuating said valve heads between a normally closed position and an open position, (h) said latter means including an operating lever, (i) and a connector extending between said lever and said valve stem whereby said valves are actuated when said lever is operated, (j) and means connected between said lever and throttle valve so that said valve heads and throttle valve are simultaneously operated upon the actuation of said manual means.

7. In combination with gasoline engine for marine use having a carburetor having an air intake and a throttle valve therein to control the air-gas mixture, and an exhaust outlet for said engine, the improvement of (a) a valve means for automatically closing the inlet to said air intake and to said exhaust outlet respectively in the event the engine is accidentally submerged in water to prohibit flooding of the engine, (b) said valve means including a valve head adapted to form a closure for the exhaust outlet, (c) biasing means for normally biasing said valve head for exhaust outlet closed, said biasing means having a force sufficient to close said exhaust outlet when the engine is not operating and which force is automatically overcome by the pressure of the exhaust acting thereon to open said exhaust outlet when the engine is operating, (d) and said valve means including a second valve head for closing the inlet to said intake, (e) means for normally biasing said second valve head closed, (f) and means for effecting the manual operation of said second valve head between its open and closed position, (g) and means operatively connecting said manually operated means to said second valve head and said throttle valve so that said second valve means and throttle valve can be simultaneously operated upon the actuation of said manual means.

8. In combination with gasoline engine for marine use having a carburetor having an air intake and a throttle valve therein to control the air-gas mixture, and an exhaust outlet for said engine, the improvement of (a) a valve means for automatically closing the inlet to said air intake and to said exhaust outlet respectively in the event the engine is accidentally submerged in water to prohibit flooding of the engine, (b) said valve means including a valve head adapted to form a closure for the exhaust outlet, (c) means for slidably supporting said valve head adjacent said exhaust outlets, (d) biasing means for normally biasing said valve head for exhaust outlet closed, said biasing means being automatically overcome by the pressure of the exhaust gases acting thereon, when the engine is operating, (e) and said valve means including a second valve head for closing the inlet to said intake, (f) means for slidably supporting said second valve head adjacent said air intake, (g) means for normally biasing said second valve head closed, (h) and means for effecting the manual operation of said second valve head between its open and closed position, said means including a lever, (i) and means operatively connecting said lever to said second valve means and said throttle valve so that said second valve means and throttle valve can be simultaneously operated upon the actuation of said lever.

9. In combination with an engine adapted for marine use and having an air inlet controlled by a throttle valve and an exhaust outlet, (a) means for sealing said air inlet and exhaust outlet against flooding in the event the engine is accidentally submerged, (b) said means including a water tight valve means for closing the exhaust outlet, (c) and means disposed in said air inlet to define a fluid tight seal with said throttle valve in the closed position thereof, (d) and means operatively connected to said throttle valve to effect the operation thereof when the engine is rendered operative and to render said throttle inoperative when the engine is not operating whereby said throttle valve effects a fluid tight seal.

10. The invention as defined in claim 9 wherein said sealing means comprise an internal shoulder formed in said air intake and a sealing gasket seated on said shoulder to define with the periphery of said throttle valve a water tight seal when closed.

11. The invention as defined in claim 9 wherein said throttle valve is a butterfly type valve.

12. The invention as defined in claim 9 wherein said throttle valve is a flap type valve.

13. A marine engine in combination with a carburetor having a throttle valve and air intake operatively associated therewith, and an exhaust outlet, the improvement comprising:

(a) valving means for effecting a water tight closure for said air intake and said exhaust outlet in the event said engine is submerged so as to prohibit flooding and water damage thereto, (b) said valving means including a valve head closure on the inlet to said air intake, (c) a second valve head closure for said exhaust outlet, (d) means operatively connected to each of said valve head closures for opening each of said valve head closures when the engine is operating, (e) said means of effecting the opening of said valve head closure of said air intake including a rack and pinion assembly, (f) said rack of said assembly being operatively connected to said valve head closure of said air intake, (g) and said pinion adapted to mesh with said rack being connected to the shaft of the throttle valve, (h) and means for effecting the adjustment of the throttle valve whereby the setting of said throttle valve effects the opening of said air intake simultaneously therewith.

14. The invention as defined in claim 10 and including means for mounting the valve head closure for said exhaust outlet whereby the same is automatically opened when the engine is operating only.

15. A marine engine in combination with a carburetor having a throttle valve and air intake operatively associated therewith, and an exhaust outlet, the improvement comprising:
   (a) valving means for effecting a water tight closure for said air intake and said exhaust outlet in the event said engine is submerged so as to prohibit flooding and water damage thereto,
   (b) said valving means including a valve head closure on the inlet to said air intake, and
   (c) a second valve head closure for said exhaust outlet,
   (d) means for effecting the automatic opening of said second valve head closure when the engine is operating,
   (e) means operatively connected for effecting the opening and closing of said first mentioned valve head closure,
   (f) said latter means including a rack and pinion assembly operatively connecting said second valve closure to said throttle valve,
   (g) and means for effecting the adjustment of the throttle valve whereby the setting of said throttle valve effects the simultaneous opening of said valve head closure,
   (h) and means for biasing said second valve closure toward its closed position when said engine is upset.

No references cited.

MARK NEWMAN, *Primary Examiner.*

L. M. GOODRIDGE, *Assistant Examiner.*